US008251588B2

(12) United States Patent
Horie et al.

(10) Patent No.: US 8,251,588 B2
(45) Date of Patent: Aug. 28, 2012

(54) MOTION GUIDE DEVICE HAVING DIRECTION CHANGING PASSAGES THAT CROSS EACH OTHER THREE-DIMENSIONALLY AND A METHOD OF ASSEMBLING THE SAME

(75) Inventors: Takuya Horie, Tokyo (JP); Hiroaki Mochizuki, Tokyo (JP)

(73) Assignee: THK Co., Ltd., Tokyo (JP)

( * ) Notice: Subject to any disclaimer, the term of this patent is extended or adjusted under 35 U.S.C. 154(b) by 1083 days.

(21) Appl. No.: 11/574,771

(22) PCT Filed: Sep. 6, 2005

(86) PCT No.: PCT/JP2005/016325
§ 371 (c)(1),
(2), (4) Date: Oct. 5, 2007

(87) PCT Pub. No.: WO2006/028084
PCT Pub. Date: Mar. 16, 2006

(65) Prior Publication Data
US 2008/0037914 A1    Feb. 14, 2008

(30) Foreign Application Priority Data
Sep. 6, 2004    (JP) .................................. 2004-258214

(51) Int. Cl.
*F16C 29/06*    (2006.01)
(52) U.S. Cl. ................................ 384/45; 384/43; 384/44
(58) Field of Classification Search .................... 384/43, 384/44, 45; 74/89.32, 89.33
See application file for complete search history.

(56) References Cited

U.S. PATENT DOCUMENTS
4,743,124 A * 5/1988 Blaurock ........................ 384/45
(Continued)

FOREIGN PATENT DOCUMENTS
JP    1-238714 A    9/1989
(Continued)

OTHER PUBLICATIONS
International Search Report of PCT/JP2005/016325, date of mailing: Dec. 20, 2005.
(Continued)

*Primary Examiner* — James Pilkington
*Assistant Examiner* — Alan Waits
(74) *Attorney, Agent, or Firm* — Westerman, Hattori, Daniels & Adrian, LLP (57) ABSTRACT

The present invention provides a motion guide device having inner and outer direction changing passages that mutually cross three-dimensionally, in which a retainer is able to smoothly circulate even when an outer peripheral side of the inner direction changing passage as well as an outer peripheral side of the outer direction changing passage are formed on an end plate.

An outer peripheral side (18) of the outer direction changing passage and an outer peripheral side (19) of the inner direction changing passage are so formed on an end plate (5) as to cross each other three-dimensionally. Built in the end plate (5) is an inner/outer direction changing passage component (24) formed to serve as not only an inner peripheral side (25) of the outer direction changing passage but also an outer peripheral side (26) of the inner direction changing passage together with the outer peripheral side (19) of the inner direction changing passage formed on the end plate (5). Built in the end plate (5) in which the inner/outer direction changing passage component (24) is built is a retainer guiding member (29) formed extending over an entire length of the inner direction changing passage and to guide an outer peripheral side of the retainer (10) that passes the inner direction changing passage.

5 Claims, 7 Drawing Sheets

U.S. PATENT DOCUMENTS

| | | | |
|---|---|---|---|
| 4,799,805 A * | 1/1989 | Tanaka | 384/44 |
| 4,869,600 A | 9/1989 | Tonogai | |
| 5,193,914 A * | 3/1993 | Tanaka | 384/45 |
| 5,308,164 A * | 5/1994 | Tanaka | 384/13 |
| 6,217,217 B1 | 4/2001 | Teramachi | |
| 6,729,760 B2 * | 5/2004 | Mochizuki et al. | 384/45 |
| 2002/0136472 A1 | 9/2002 | Mochizuki et al. | |
| 2002/0172436 A1 | 11/2002 | Shirai et al. | |

FOREIGN PATENT DOCUMENTS

| | | |
|---|---|---|
| JP | 7-208467 A | 8/1995 |
| JP | 2002-54633 A | 2/2002 |

OTHER PUBLICATIONS

International Preliminary Report of Patentability for PCT/JP2005/016325.

European Search Report dated Nov. 18, 2008, issued in corresponding European Patent Application No. 05782206.6.

* cited by examiner

CROSS SECTION
ALONG II-II LINE

MOTION GUIDE DEVICE HAVING DIRECTION CHANGING PASSAGES THAT CROSS EACH OTHER THREE-DIMENSIONALLY AND A METHOD OF ASSEMBLING THE SAME

TECHNICAL FIELD

The present invention relates to a motion guide device, such as a liner guide, in which a moving member is able to move relatively to a track member, and in particular, to the type of motion guide device in which direction changing passages cross each other three-dimensionally.

BACKGROUND ART

A liner guide, which is one kind of motion guide devices, comprises a track rail on which a plurality of rolling-member rolling surficial areas are formed to extend an axial direction thereof and a saddle-shaped moving block built with the track rail so as to be slidable therealong using a number of rolling members, such as rollers or balls, disposed therebetween. On the moving block, there are formed load rolling-member rolling surficial areas each opposed to the rolling-member rolling surficial areas of the track rail, non-load rolling-member return passages each extending in parallel with the load rolling-member rolling surficial areas, and direction changing passages mutually connecting load rolling-member rolling surficial areas and the non-load rolling-member return passages, respectively. The rolling members circulate along each of circuit-like rolling-member circulation passages each composed of a load rolling-member rolling passage formed respectively between the load rolling-member rolling surficial areas of the track rail and the non-load rolling-member return passages of the moving block, a non-load rolling-member return passage, and direction changing passages.

These rolling-member circulation passages may be four in number, every two passages on both sides of the track rail, that is, four passages in total. The present applicant proposed a liner guide of type in which two direction changing passages on both sides of a track rail (i.e., inner and outer direction changing passages) cross each other three-dimensionally at a crossing angle of 90 degrees (refer to a patent reference 1).

In this liner guide, both of the inner and outer direction changing passages, which mutually cross three-dimensionally, are formed by a combination of end plates, inner/outer direction changing passage components, and inner direction changing passage components. To be specific, on the end plates, outer peripheral sides of the outer direction changes passages are formed. On a side of one of the inner/outer direction changing passage components, inner peripheral sides of the outer direction changing passage are formed, and on the side opposite thereto, outer peripheral sides of the inner direction changing passages are formed. In addition, inner peripheral sides of the inner direction changing passages are formed on the inner direction changing passage components.
"Patent reference 1: Japanese Patent Laid-open Publication No. 2002-54633"

DISCLOSURE OF THE PATENT

Problem to be Solved by the Invention
In the foregoing linier guide, only the outer peripheral side of the outer direction changing passage is formed on the end plate, while the outer peripheral side of the inner direction changing passage is formed on the inner/outer direction changing passage component assembled into the end plate. Hence when assembling errors caused when the inner/outer direction changing passage component is assembled into the end plate and/or dimensional errors of the end plate and inner/outer direction changing passage component themselves are larger, there may cause a misalignment in the crossing angle between the inner and outer direction changing passages. When such a misalignment in the crossing angle is caused between the direction changing passages, the rolling members are forced to move poorly. Hence, the conventional liner guide requires accuracy in assembling work and parts dimensions to be controlled strictly.

In order to solve the foregoing problem, it is conceivable to employ the following measures. The end plate is made to be thick so that both outer peripheral sides of the outer and inner direction changing passages are formed on the end plate. In this structure, both of the inner and outer direction changing passages cross to each other three-dimensionally, resulting in that the outer peripheral side of the inner direction changing passage is formed to have a difference in level to the outer peripheral side of the outer direction changing passage. Then, on the inner/outer direction changing passage component to be assembled into each end plate, there are formed the inner peripheral side of the outer direction changing passage as well as the outer peripheral side of the inner direction changing passage composing the outer peripheral side of the inner direction changing passage with the help of the outer peripheral side of the inner direction changing passage formed on the end plate. And, on the inner direction changing passage component to be built with the inner/outer direction changing passage component, the inner peripheral side of the inner direction changing passage is formed.

However, in this structure, the outer peripheral side of the inner direction changing passage is composed of both the end plate and the inner/outer direction changing passage component. It is therefore inevitable to have seams between the end plate and the inner/outer direction changing passage component in the outer peripheral side of the inner direction changing passage. Such seam portions are results in differences in level if there are errors in assembling the parts and/or in producing parts.

In the liner guide with a retainer rotatably retaining rolling members, not only the rolling members but also the retainer circulate along a rolling-member circulation passage. The foregoing differences in level, in particular, the tip portions thereof, become obstacles against smooth motions of the retainer circulating along the outer peripheral side of the direction changing passage. In addition, in a motion guide device directed to rollers with no retainer, which is called an all-rolling-member type of liner motion guide, such differences in level prevent smooth motions of the rolling members.

An object of the present invention is to provide a motion guide device whose retainer or rolling members which are able to smoothly circulate even when the outer peripheral side of the inner direction changing passage as well as the outer peripheral side of the outer direction changing passage are formed on the end plate.
Means for Solving Problem
Hereinafter, the present invention will now be described. For the sake of an easier understanding of the present invention, reference letters shown in the appending drawings are put in parenthesis in the followings, but this does not intend to mean that the gist of the present invention are limited to the modes shown in the appending drawings.

In order to solve the foregoing, the invention according to claim 1 provides a motion guide device comprising: a track rail (1) in which a plurality of rolling-member rolling surficial areas (1*b*) are formed along a longitudinal direction; a moving block body (2) in which a plurality of load rolling-member rolling surficial areas (2*d*) are formed to be opposed to the rolling-member rolling surficial areas (1*b*) and a plurality of non-load rolling-member return passages (8) are formed to extend in parallel with the load rolling-member rolling surficial areas (2*d*); a plurality of rolling members (3) that roll between the rolling-member rolling surficial areas (1*b*) of the track rail (1) and the load rolling-member rolling surficial areas (2*d*) of the moving block body (2); and a retainer (10) rotatably retaining the plurality of rolling members (3) as a series of rolling members, wherein an outer direction changing passage (6-1) and an inner direction changing passage (6-2) that both connect the plurality of load rolling-member rolling surficial areas (2*d*) and the plurality of non-load rolling-member return passages (8) in the moving block body (2) cross each other three-dimensionally, characterized in that the motion guide device comprises:

a side cover (5) disposed on each of both ends of the moving block body (2) in a moving direction thereof and formed so that an outer peripheral side (18) of the outer direction changing passage and an outer peripheral side (19) of the inner direction changing passage cross each other three-dimensionally; an inner/outer direction changing passage component built in the side cover (5) and formed to serve as not only an inner peripheral side (25) of the outer direction changing passage but also an outer peripheral side (26) of the inner direction changing passage together with the outer peripheral side (19) of the inner direction changing passage formed on the side covers (5); a retainer guiding member (29) built in the side cover (5) in which the inner/outer direction changing passage component (24) is built, formed to extend over an entire length of the inner direction changing passage (6-2), and formed to guide an outer peripheral side of the retainer (10) that passes the inner direction changing passage (6-2); and an inner direction changing passage component (30) that forms an inner peripheral side (25) of the inner direction changing passage.

In the motion guide device according to claim 1, the invention according to claim 2 is characterized in that the inner direction changing passage component (30) has a retainer guiding portion (25*a*) guiding the inner peripheral side of the retainer (10) that passes the inner direction changing passage (6-2).

In the motion guide device according to claim 1 or 2, the invention according to claim 3 is characterized in that a retainer-outer-peripheral guide portion (18*a*) guiding an outer peripheral side of the retainer (10) that passes the outer direction changing passage (6-1) is formed in the side cover (5), and a retainer-inner-peripheral guide portion (25*a*) guiding an inner peripheral side of the retainer (10) that that passes the outer direction changing passage (6-1) is formed in the inner/outer direction changing passage component (24).

The invention according to claim 4 provides a motion guide device comprising: a track rail (1) in which a plurality of rolling-member rolling surficial areas (1*b*) are formed along a longitudinal direction; a moving block body (2) in which a plurality of load rolling-member rolling surficial areas (2*d*) are formed to be opposed to the rolling-member rolling surficial areas (1*b*) and a plurality of non-load rolling-member return passages (8) are formed to extend in parallel with the load rolling-member rolling surficial areas (2*d*); and a plurality of rolling members (3) that roll between the rolling-member rolling surficial areas (1*b*) of the track rail (1) and the load rolling-member rolling surficial areas (2*d*) of the moving block body (2), wherein an outer direction changing passage (6-1) and an inner direction changing passage (6-2) that both connect the plurality of load rolling-member rolling surficial areas (2*d*) and the plurality of non-load rolling-member return passages (8) in the moving block body (2) cross each other three-dimensionally, characterized in that the motion guide device comprises:

a side cover (5) disposed on each of both ends of the moving block body (2) in a moving direction thereof and formed so that an outer peripheral side (18) of the outer direction changing passage and an outer peripheral side (19) of the inner direction changing passage cross each other three-dimensionally; an inner/outer direction changing passage component built in the side cover (5) and formed to serve as not only an inner peripheral side (25) of the outer direction changing passage but also an outer peripheral side (26) of the inner direction changing passage together with the outer peripheral side (19) of the inner direction changing passage formed on the side cover (5); a rolling-member guiding member built in the side cover (5) in which the inner/outer direction changing passage component (24) is built, formed to extend over an entire length of the inner direction changing passage (6-2), and formed to guide outer peripheral sides of the rolling members (3) that pass the inner direction changing passage (6-2); and an inner direction changing passage component (30) that forms an inner peripheral side of the inner direction changing passage.

The invention according to claim 5 provides a method of assembling a motion guide device comprising: a track rail (1) in which a plurality of rolling-member rolling surficial areas (1*b*) are formed along a longitudinal direction; a moving block body (2) in which a plurality of load rolling-member rolling surficial areas (2*d*) are formed to be opposed to the rolling-member rolling surficial areas (1*b*) and a plurality of non-load rolling-member return passages (8) are formed to extend in parallel with the load rolling-member rolling surficial areas (2*d*); a plurality of rolling members (3) that roll between the rolling-member rolling surficial areas (1*b*) of the track rail (1) and the load rolling-member rolling surficial areas (2*d*) of the moving block body (2); and a retainer (10) rotatably retaining the plurality of rolling members (3) as a series of rolling members, wherein an outer direction changing passage (6-1) and an inner direction changing passage (6-2) that both connect the plurality of load rolling-member rolling surficial areas (2*d*) and the plurality of non-load rolling-member return passages (8) in the moving block body (2) cross each other three-dimensionally, characterized in that the method comprising steps of:

assembling, into a side cover (5) formed to allow both an outer peripheral side (18) of the outer direction changing passage and an outer peripheral side (19) of the inner direction changing passage to cross each other three-dimensionally, an inner/outer direction changing passage component (24) formed to serve as not only an inner peripheral side (25) of the outer direction changing passage but also an outer peripheral side (26) of the inner direction changing passage together with the outer peripheral side (19) of the inner direction changing passage formed on the side cover (5); assembling, into the side cover (5) in which the inner/outer direction changing passage component (24) is built, a retainer guiding member (29) guiding an outer peripheral side of a retainer (10) that passes the inner direction changing passage; assembling, into the side cover (5) in which both the inner/outer direction changing passage components (24) and the retainer guiding members (29) are built, an inner direction changing passage component (30) that forms an inner peripheral side (31) of the inner direction changing passage and is formed to have a retainer guiding portion (32) guiding an inner side of the retainer (10) that passes the inner direction changing passage (6-2); and mounting, to the moving block body (2), the side cover (5) in which the inner/outer direction changing passage component (24), the retainer guiding member (29), and the inner direction changing passage component (30) are built.

Effect of the Invention

In the invention according to claim 1, the outer peripheral sides of the outer and inner direction changing passages are formed on the side cover, so that the angles of the outer and inner direction changing passages are prevented from shifting in positions. Hence the rolling members circulate smoothly. In addition, the retainer guiding member is provided such that this member extends over an entire length of the inner direction changing passage and guides the outer peripheral side of the retainer passing the inner direction changing passage. Hence, a difference in level, which is caused when the outer peripheral side of the inner direction changing passage is formed by the side cover and the inner/outer direction changing passage component, can be avoided from being formed on the outer peripheral side of the inner direction changing passage. The retainer retaining the rolling members is therefore able to circulate smoothly without tripping on the difference in level.

As proposed by the invention according to claim 2, the inner direction changing passage component is formed to have a retainer guiding portion guiding the inner peripheral side of the retainer that passes the inner direction changing passage, so that the number of parts can be lessened.

As proposed by the invention according to claim 3, a retainer-outer-peripheral guide portion guiding an outer peripheral side of the retainer that passes the outer direction changing passage is formed in the side cover and a retainer-inner-peripheral guide portion guiding an inner peripheral side of the retainer that that passes the outer direction changing passage is formed in the inner/outer direction changing passage component. Hence the number of parts can be lessened.

In the invention according to claim 4, the outer peripheral sides of the outer and inner direction changing passages are formed on the side cover, so that the angles of the outer and inner direction changing passages are prevented from shifting in positions. Hence the rolling members circulate smoothly. In addition, the rolling-member guiding member is provided such that this member extends over the entire length of the inner direction changing passage and guides the outer peripheral side of the rolling members passing the inner direction changing passage. Hence, a difference in level, which is caused on the outer peripheral side of the inner direction changing passage when the inner peripheral sides of the outer and inner direction changing passages are formed on the side cover, can be avoided from being formed on the outer peripheral side of the inner direction changing passage. The rolling members are therefore able to circulate smoothly without tripping on the difference in level.

In the invention according to claim 5, the retainer guiding member, which extends over the entire length of the inner direction changing passage and guides the outer peripheral side of the retainer passing the inner direction changing passage, is assembled into the side cover in which the inner/outer direction changing passage component has been built. Hence, a difference in level, which is caused on the outer peripheral side of the inner direction changing passage when the inner peripheral sides of the outer and inner direction changing passages are formed on the side cover, can be avoided from being formed on the outer peripheral side of the inner direction changing passage. The rolling members are therefore able to circulate smoothly without tripping on the difference in level.

EXPLANATIONS OF LETTERS OR NUMERALS

1 track rail
1*b* roller rolling surface (rolling-member rolling surficial area)
2*d* load roller rolling surface (load roller rolling surficial area)
2 moving block body
3 roller (rolling member)
5 end plate (side cover)
6-1 outer direction changing passage
6-2 inner direction changing passage
7 load roller rolling passage (load rolling-member rolling passage)
8 non-load roller return passage (non-load rolling-member return passage)
10 retainer (retainer)
18 outer peripheral side of outer direction changing passage
18*a* retainer-outer-peripheral guide portion
19 outer peripheral side of inner direction changing passage
24 inner/outer direction changing passage component
25 inner peripheral side of cuter direction changing passage
25*a* retainer-inner-peripheral guide portion
26 outer peripheral side of inner direction changing passage
29 retainer guiding member
30 inner direction changing passage component
31 inner peripheral side of inner direction changing passage
32 retainer guiding portion

BEST MODES FOR CARRYING OUT THE INVENTION

Figure 1:
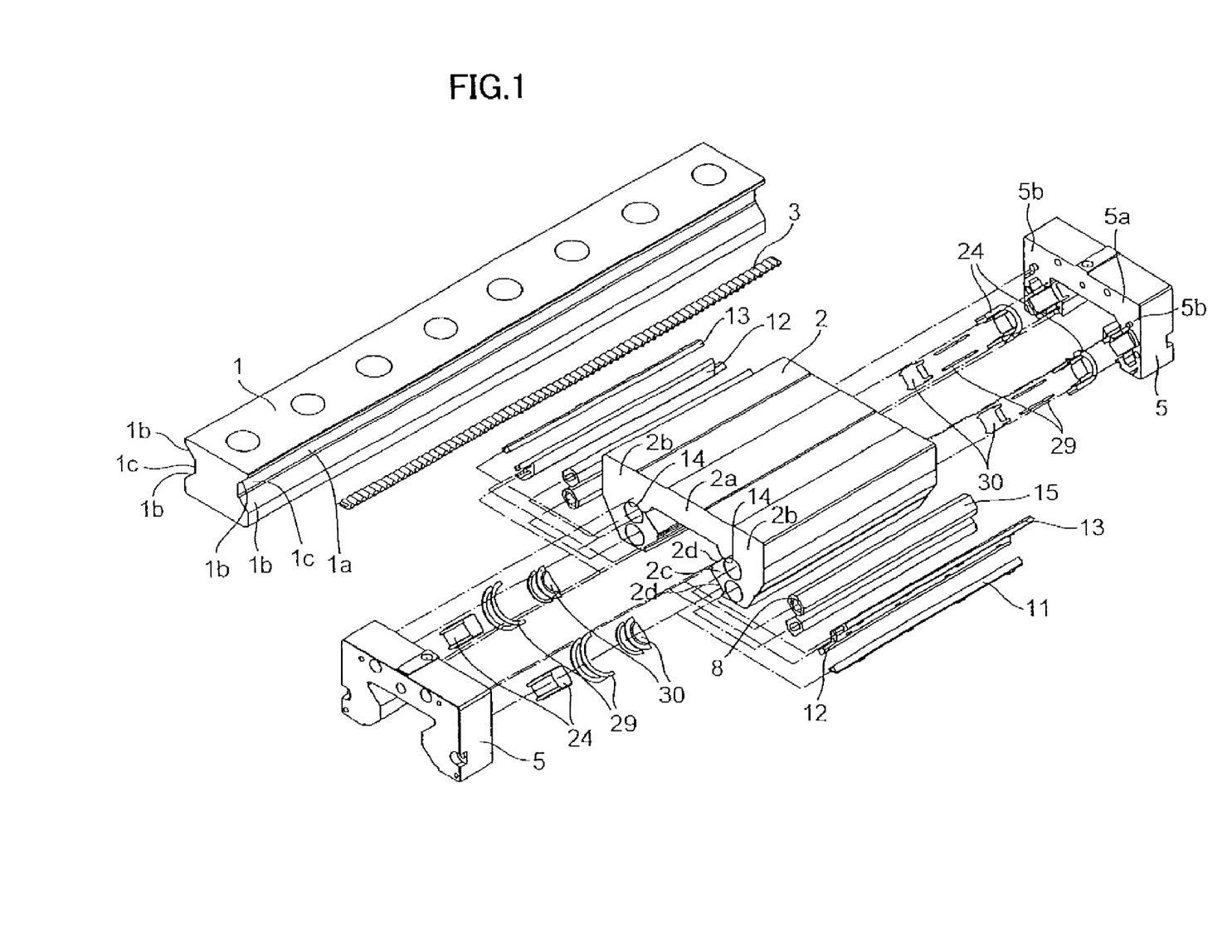
[FIG. 1] is an exploded perspective view showing a linier motion guide device according to a first embodiment of the present invention.
Figure 2:
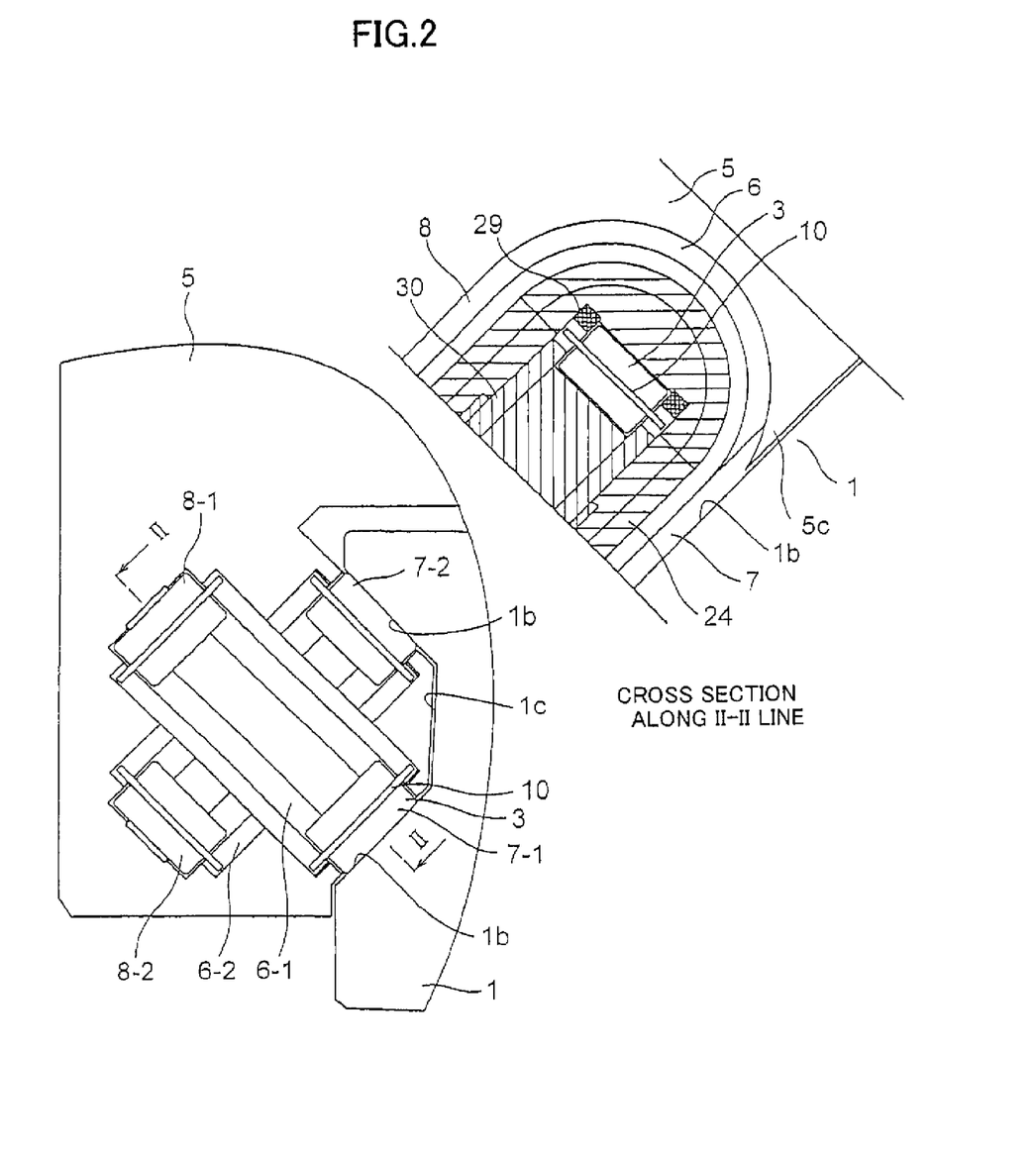
[FIG. 2] is a sectional view showing an end plate portion of the liner motion guide device.

FIGS. 1 and 2 show a liner motion guide device (liner guide) serving as a motion guide device according to an embodiment of the present invention. FIG. 1 shows a perspective view of the liner motion guide device and FIG. 2 show a section view of one end plate potion (, from which an inner/outer direction changing passage component and an inner direction changing passage component are removed, as shown in FIG. 2).

The liner motion guide device is equipped with a track rail 1 serving as a track member extending linearly and a moving block body 2 movably arranged along the track rail 1 with the help of rollers 3 positioned therebetween, the rollers serving as a number of rolling members.

The track rail 1 is an elongated long member having a substantially rectangular in section. On each of the right and left sides of the track rail 1, a groove 1*a* formed with wall surfaces 1*b* and a bottom surface 1*c* is formed along a longitudinal direction of the track rail. Both side wall surfaces 1*b* of each groove 1*a* cross with each other at an angle of 90 degrees. The upper wall surface 1*b* and the lower wall surface 1*b* are provided as roller rolling surfaces that allows the rollers to roll thereon and therealong. On the right and left sides of the track rail 1 is provided a total of four roller rolling surfaces 1*b*, i.e., two upper and lower roller rolling surfaces formed on each side, each serving as rolling-member rolling surficial area.

The moving block body 2 includes a central part 2*a* positioned to face the upper surface of the track rail 1 and side wall parts 2*b* formed to extend downward from the right and left sides of the central part 2*a* so that the side wall parts 2*b* face the right and left side surfaces of the track rail 1, respectively. Each of the side wall parts 2*b* of the moving block body 2 is formed to have a protruded part 2*c* whose shape agrees with that of each groove la formed on each side surface of the track rail 1. On each protruded part 2*c* is formed load roller rolling surfaces 2*d* serving as load roller rolling surficial areas and facing the roller rolling surfaces 1*b*. The load roller rolling surfaces 2*d* are formed by four in total, which is composed of two upper and lower surfaces 2*d* on each side wall part 2*b* of the moving block body 2.

Between each roller rolling surface 1*b* of the track rail 1 and each load roller rolling surface 2*d* of the moving block body 2, a plurality of rollers 3 are provided. The plurality of rollers 3 roll under a load along a load roller rolling passage between the roller rolling surface 1*b* of the track rail 1 and the load roller rolling surface 2*d* of the moving block body 2. When the rollers 3 have reached one end of the load roller rolling surface 2*d* of the moving block body 2, the rollers 3 are scooped up by a scooping portion 5*c* formed at the end plate 5, as shown in FIG. 2. Then the rollers 3 roll along a U-shaped direction changing passage 6, before entering a non-load roller return passage 8 which is formed to extend in parallel with a load roller rolling passage 7. After passing the non-load roller return passage 8, the rollers 3 roll along a direction changing passage formed at the opposite end plate, and then re-enter the load roller rolling passage 7. The load roller rolling passage 7, direction changing passages 6, and non-load roller return passage 8 form a circuit-like roller circulation passage.

As shown in FIG. 2, two load roller rolling passages 7-1 and 7-2 are formed along each of the right and left side wall parts 2*b* of the moving block body 2, respectively. Meanwhile two non-load roller return passages 8-1 and 8-2 are formed, so as to be positioned up and down, along each of the right and left side wall parts 2*b* of the moving block body 2, respectively. An inner direction changing passage 6-1 connects the lower load roller rolling passage 7-1 and the upper non-load roller return passage 8-1, while an outer direction changing passage 6-2 connects the upper load roller rolling passage 7-2 and the lower non-load roller return passage 8-2. To realize these connections, both the inner and outer direction changing passages 6-1 and 6-2 are connected with each other to three-dimensionally cross the load roller rolling passage 7 and the non-load roller return passage 8. The components that compose the inner and outer direction changing passages 6-1 and 6-2 will now be described later.

Figure 3:
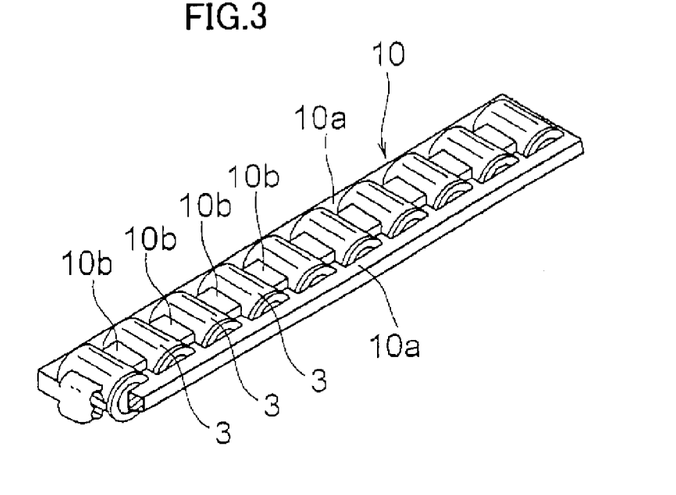
[FIG. 3] is a perspective view showing rollers retained in series by a retainer.

FIG. 3 shows the rollers retained as a series of rollers by a retainer serving as a retaining member. The retainer 10 comprises spacers 10*b* each intervening between rollers 3 and flexible belts 10*a* linking the spacers. The belts 10*a* are formed to expand outward further than both end surfaces of each roller 3 in the axial direction thereof. On the roller circulation passage is formed a guide groove guiding the expanded belts 10*a* in such a manner that the guide groove runs along the entire length of the roller circulation passage.

As shown in FIG. 1, longer support members 11, 12 and 13 are arranged at both side edges of the load roller rolling surfaces 2*d*. The support members 11, 12 and 13, which are made of resin, have guide grooves which guide retainer 10 so as to prevent the rollers 3 from dropping off from the load roller rolling surfaces 2*d* when the moving block body 2 is removed from the track rails 1. Of these support members, the first support members 11 are arranged to guide the lower part of the retainer 10 that moves along the lower roller rolling surfaces 2*d*. The second support members 12 are arranged to guide not only the upper part of the retainer 10 that moves along the lower roller rolling surfaces 2*d* but also the lower part of the retainer 10 that moves along the upper roller rolling surface 2*d*. The third support members 13 are arranged to guide the upper part of the retainer 10 that moves along the upper roller rolling surfaces 2*d*.

Through holes 14 are formed to extend through each of the side wall parts 2*b* of the moving block body 2 in such a manner that the through holes are parallel with the two upper and lower load roller rolling surfaces 2*d* and located a predetermined distance apart from the surfaces 2*d*. Through the through holes 14, return passage components 15 that compose non-load roller return passages are inserted, respectively. Each non-load roller return passage component 15 is made up of a pair of pipe-like half body made by dividing a longer pipe-like member into two pieces along an axial direction thereof. Along the non-load roller return passage components 15, the non-load roller return passages 8 are formed and guide grooves to guide the belts 10*a* of the retainer 10 are formed. Both ends of each of the non-load roller return passage components 15 are supported by the end plates 5.

Figure 4:
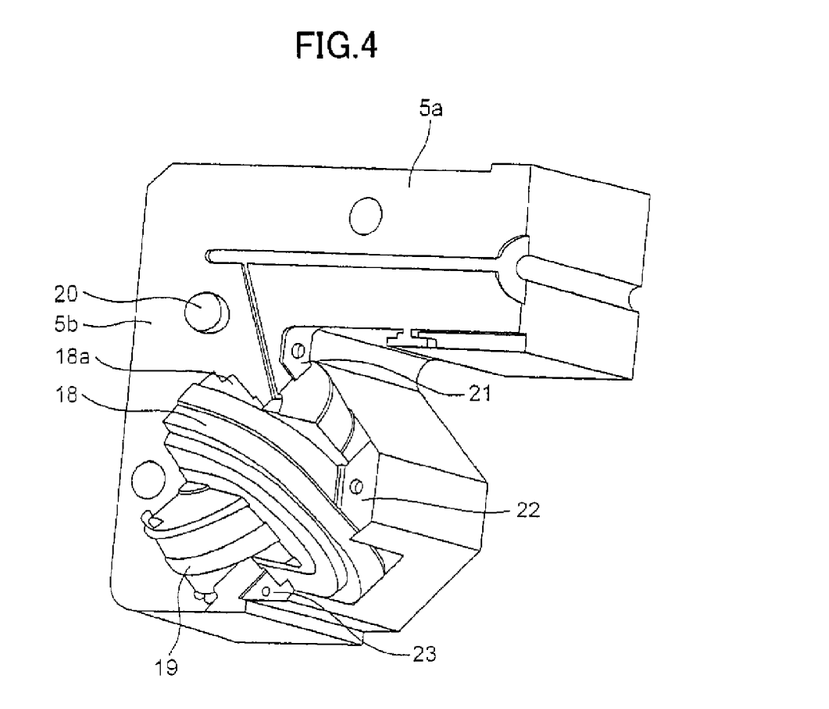
[FIG. 4] is a perspective view showing the end plate.

The components of both the inner direction changing passage and the outer direction changing passage will now be descried. FIG. 4 shows each end plate 5. The end plate 5 is made to agree in sections with the moving block body 4 and is formed to have a horizontal portion 5*a* and side wall portions 5*b* (refer to FIG. 1). In each side wall portion 5*b*, an outer peripheral side 18 of the outer direction changing passage deeply formed and an outer peripheral side 19 of the inner direction changing passage shallowly formed are formed to have a difference in level therebetween so that those sides cross to each other three-dimensionally. The outer peripheral sides 18 and 19 of both the outer and inner direction changing passages cross to each other at a perpendicular crossing angle. The central part of the outer peripheral side 19 of the inner direction changing passage formed shallowly is divided by the outer peripheral side 18 of the outer direction changing passage deeply formed. Along the outer peripheral side 18 of the outer direction changing passage of each end plate 5, retainer-outer-peripheral guide portions 18*a* is formed to guide the outer peripheral side of the retainer 10 passing the outer direction changing passage. On an end surface of each end plate 5, a positioning member 20 is formed which position the end plate 5 to the moving block body 2 is formed and positioning recesses 21, 22 and 23 are formed which position the support members 11, 12 and 13.

Figure 5:
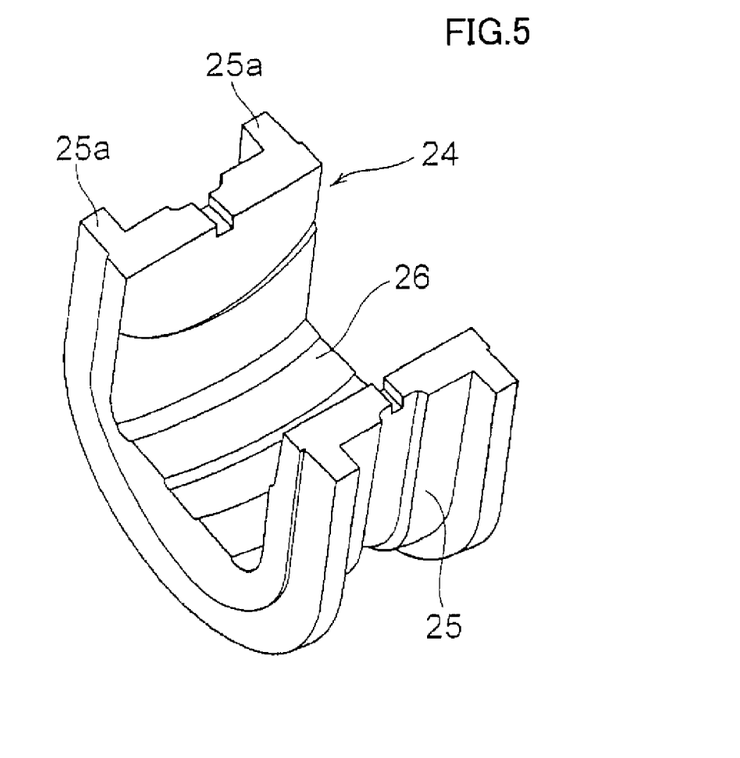
[FIG. 5] is a perspective view showing an inner/outer direction changing passage component.
Figure 8:
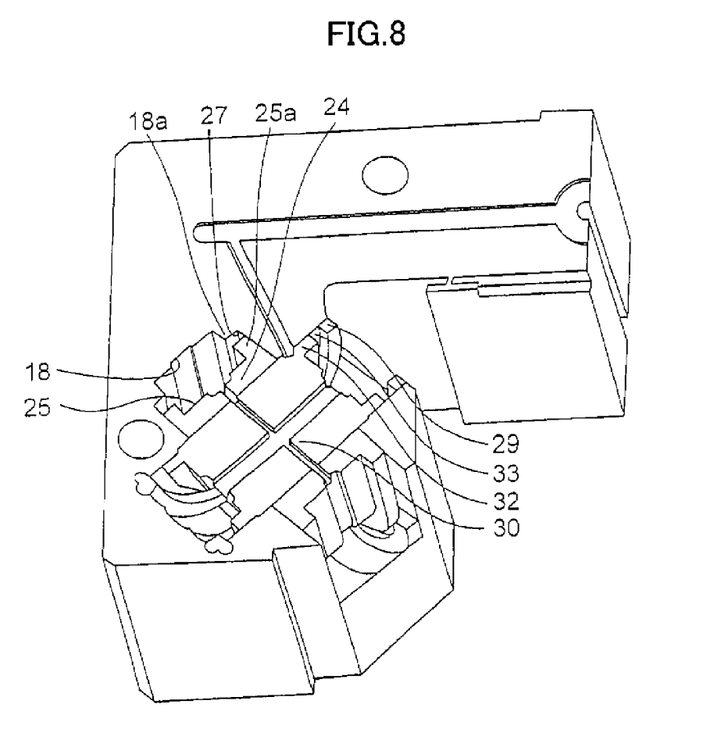
[FIG. 8] is a perspective view of the end plate in which the inner/outer direction changing passage component, the retainer guiding members, and the inner direction changing passage component are built.

FIG. 5 shows an inner/outer direction changing passage component 24 built in each end plate. This inner/outer direction changing passage component 24 is formed into, as its entire shape, a gutter. This inner/outer direction changing passage component 24 is fit to the outer peripheral side 18 of the direction changing passage formed in each end plate 15. On the outer side of the inner/outer direction changing passage 24, there is formed an inner peripheral side 25 of the outer direction changing passage, while on the inner side of that, there is formed an outer peripheral side 26 of the inner direction changing passage which forms the outer peripheral side of the inner direction changing passage together with an outer peripheral side 19 of the inner direction changing passage formed in each end plate 5. The outer direction changing passage is composed by the outer peripheral side 18 of the outer direction changing passage formed in each end plate 15 and the inner peripheral side 25 of the outer direction changing passage formed in the inner/outer direction changing passage component 24. Fitting this inner/outer direction changing passage component 24 to the end plate 5 makes it possible that the outer peripheral side 26 of the inner direction changing passage formed in the inner/outer direction changing passage component 24 is fit to the divided portion of the outer peripheral side 19 of the inner direction changing passage formed in the end plate 5, thus composing the whole outer peripheral side of the inner direction changing passage. In addition, the inner/outer direction changing passage component 24 is formed such that, along the inner peripheral sides 25 of the outer direction changing passage, there are formed retainer-inner-peripheral guide portions that guide the inner peripheral side of the retainer 10 that passes the outer direction changing passage. Thus combining the inner/outer direction changing passage component 24 with each end plate 5 creates retainer guide grooves 27 (that is, grooves guiding the retainer 10 moving along the outer direction changing passage), as shown in FIG. 8.

Figure 6:
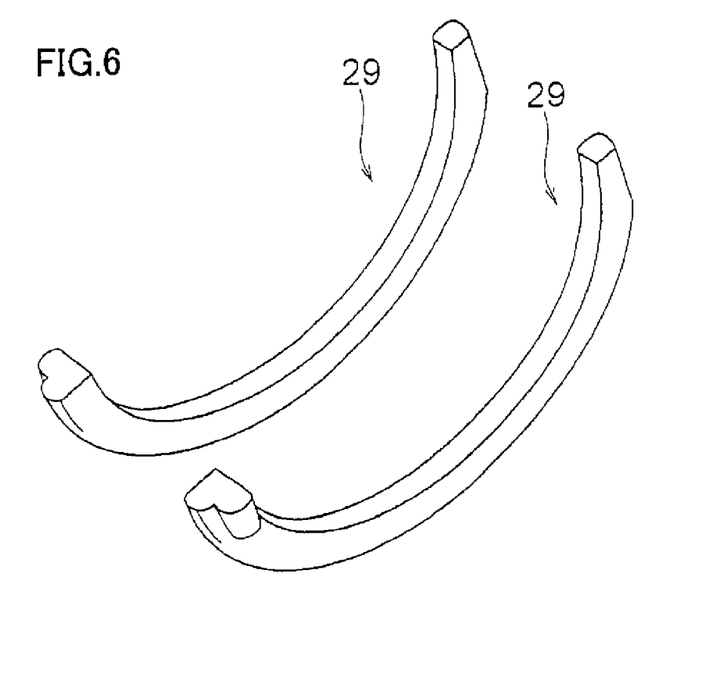
[FIG. 6] is a perspective view showing retainer guiding members.

FIG. 6 shows retainer guiding members 29 built in each end plate 5 in which the inner/outer direction changing passage component 24 is built. When the outer peripheral sides 19 and 26 of the inner direction changing passage is composed by each end plate 5 and the inner/outer direction changing passage component 24, there will be formed a difference in level at the seam between the end plate 5 and the inner/outer direction changing passage component 24. Using the retainer guiding members 29 prevents the difference in level from being formed in the outer peripheral sides 19 and 26 of the inner direction changing passage. Each retainer guiding member 29 is formed into a U-like member on the whole and is formed to extend along the entire length of the outer peripheral sides 19 and 26 of the inner direction changing passage. This retainer guiding member 29 is able to guide the outer peripheral side of the retainer 10 that passes along the inner direction changing passage.

Figure 7:
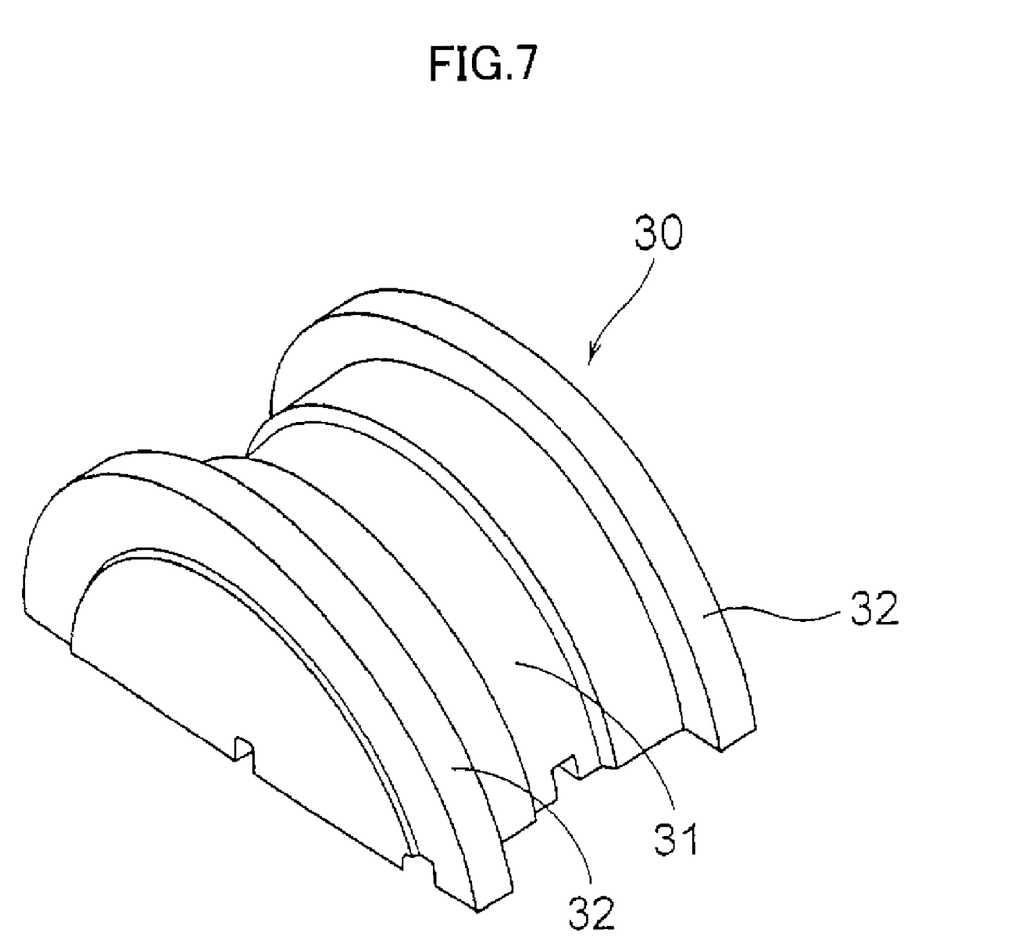
[FIG. 7] is a perspective view showing an inner direction changing passage component.

FIG. 7 shows an inner direction changing passage component 30 that composes the inner peripheral side of the inner direction changing passage. This inner direction changing passage component 30 has a shape made by dividing a cylinder into halves, so that an inner peripheral side 31 of the inner direction changing passage are formed on the half-divided member. After fitting both the inner/outer direction changing passage component 24 and the retainer guiding members 29 to each end plate 5, this inner direction changing passage component 30 is fit to the end plate 5. On both side edges of the inner peripheral side 31 of the inner direction changing passage are formed retainer guiding members 32 guiding the inner peripheral side of the retainer 10 which passes along the inner direction changing passage. Building this inner direction changing passage component into each end plate 5 allows retainer guiding grooves 33 to be formed, as shown in FIG. 8 (in which the groove guides the retainer 10 moving along the inner direction changing passage).

Figure 9:
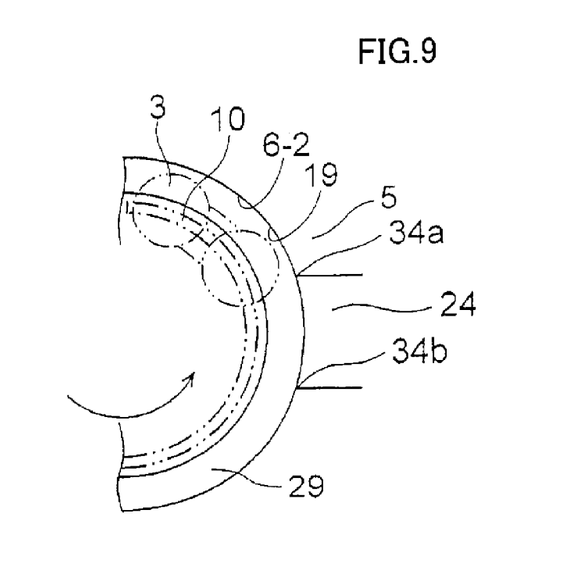
[FIG. 9] is a conceptual view explaining rollers passing the inner direction changing passage as well as the retainer.

FIG. 9 is a conceptual view showing the rollers 3 and retainer 10 which pass the inner direction changing passage. As described above, since the inner direction changing passage 6-2 has the outer peripheral side composed of the outer peripheral side 19 of the inner direction changing passage of each end plate 5 and the outer peripheral side 26 of the inner direction changing passage of the inner/outer direction changing passage component 24, there are two seams 34a and 34b between the end plate 5 and the inner/outer direction changing passage component 24. In the liner motion guide device with the retainer, a portion guiding the retainer 10 is required other than the portions guiding the rollers 3, so that there are seams at both portions guiding the rollers 3 and the retainer 10, respectively.

Figure 10:
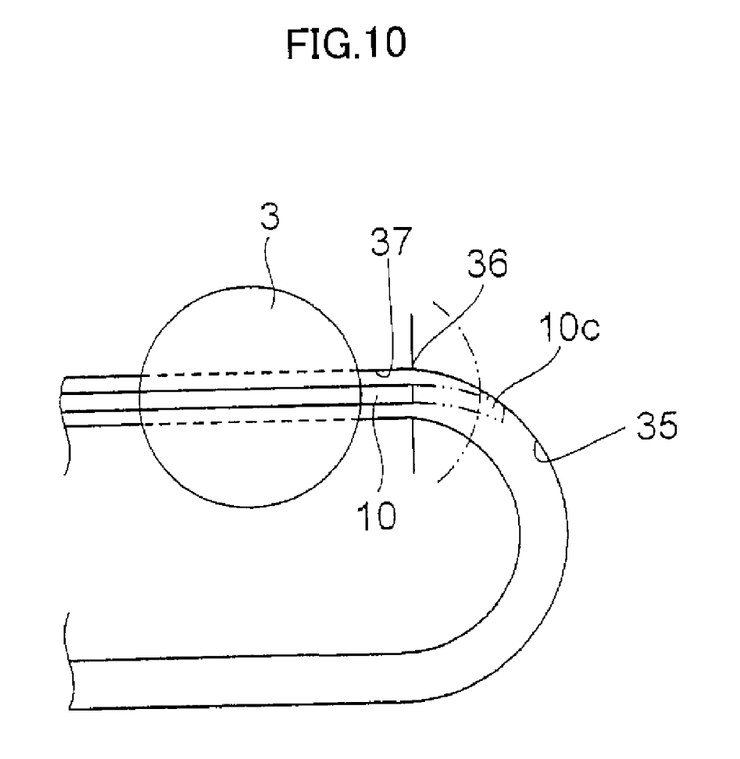
[FIG. 10] is a conceptual view showing the behaviors of the retainer that passes the inner direction changing passage.

FIG. 10 shows behaviors of the retainer 10 passing the inner direction changing passage 6-1. Immediately after a timing when the retainer enters a passage part 35 of the directing changing passage, which guides the retainer, there is no retainer-bending force acting on the tips 10c of the retainer, so that the retainer still continues moving linearly. Then the tips 10c of the retainer come in contact with the peripheral of the passage part 35 guiding the U-shaped retainer, and then the retainer passes the part 35 with its tips contacted thereto. Therefore, if there are differences in level at the seams 34a and 34b between each end plate 5 and the inner/outer direction changing passage component 24, the tips of the retainer are obliged to trip on the differences in level during its movement.

Figure 11:
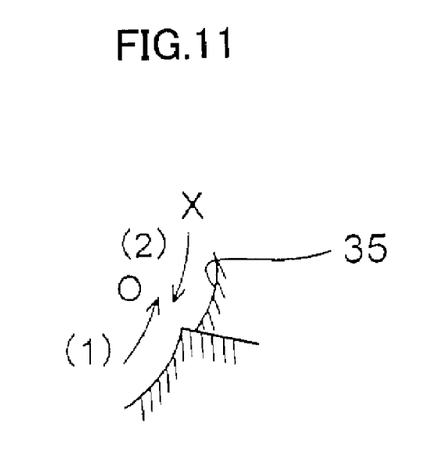
[FIG. 11] is a reference view exemplifying forming a difference in level on the inner direction changing passage.

Even if the a difference in level of the retainer-guiding part 35 is formed as shown in FIG. 11, the tips 10c of the retainer trip on the difference in level during a motion along a direction shown by an arrow (2), while the retainer is able to move without tripping during a motion along a direction shown by an arrow (1) in FIG. 11. The retainer 10 is designed to move in both directions shown by (1) and (2), resulting in that it is inevitable that the tips 10a of the retainer trip on the difference in level.

In the present embodiment, this problem is solved by additionally arranging the retainer guiding members 29 with no seams (refer to FIG. 9). The outer peripheral sides of the retainer 10 are guided by the seamless retainer guiding members 29 so that the retainer is able to move smoothly. Incidentally, if there are seams 36 formed in passage portions other than the direction changing passage (e.g., a seam between the U-shaped direction changing passage and the liner non-load return passage, as shown in FIG. 10, and a seam formed in a liner direction changing passage), the retainer 10 can move along the passage without causing such tripping actions, because there is a spacing between guiding grooves 37 for the retainer 10 and the retainer 10 and the retainer is required to slide along the wall surface of the passage. Special attention should be paid to the cases where, as described above, there are seams formed in the outer peripheral side of the direction changing passage.

By the way, the rollers 3 are moved along the outer peripheral side of the inner direction changing passage 6-2, it is also desirable that there is no difference in level in the part along which the rollers 3 pass. However, in the case of the rollers 3, the rollers 3 will not cause trips on differences in level as frequently as the tips 10a of the retainer. Thus, the present embodiment does not employ a structure in which a seamless roller guiding member is arranged at a passage part along which the rollers 3 move.

How to assemble the motion guide device will now be described. First, the support members 11, 12 and 13 and the non-load roller return passage component 15 are assembled into the moving block body 2.

Then, into each end plate 5 in which both the outer peripheral sides 18 of the outer and inner direction changing passages cross to each other three-dimensionally (refer to FIG. 4), the inner/outer direction changing passage component 24 is assembled. This inner/outer direction changing passage component 24 composes not only the outer peripheral side 25 of the outer direction changing passage but also the outer peripheral side 26 of the inner direction changing passage with the help of the outer peripheral side 19 of the inner direction changing passage formed in each end plate 5. In this end plate 5, the retainer-outer peripheral guide portion 18a is formed, while in the inner/outer direction changing passage component 24, the retainer-inner-peripheral guide portion 25a is formed. Hence, as shown in FIG. 8, by assembling the inner/outer direction changing passage component 24 into the end plate 5, the retainer guide grooves 27 which guide the retainer 10 can be formed.

Then, into the end plate 5 in which the inner/outer direction changing passage component 24 is built, the retainer guiding members 29 are assembled.

Then, into the end plate 5 in which the inner/outer direction changing passage component 24 and the retainer guiding members 29 are built, the inner direction changing passage component 30 is assembled. This inner direction changing passage component 30 has the retainer guiding members 32 formed therein, with the result that assembling the inner direction changing passage component 30 into the end plate 5 enables the formation of the retainer guiding grooves 33 to guide the retainer 10.

And then, the end plate 5, in which the inner/outer direction changing passage component 24, the retainer guiding members 29, and the inner direction changing passage component 30 are build, is positioned on and attached to one end side of the moving block body 2 in the moving direction thereof. After this, the rollers 3 mutually linked and retained by the retainer 10 as a series of rolling members are inserted into the roller circulation passage from the other end side of the moving block body 4, that is, the end opposite to the end plate 5 loading side described above.

Finally, on the other end side of the moving block body 4, the end plate 5 is attached in which the inner/outer direction changing passage component 24, the retainer guiding members 29, and the inner direction changing passage component 30 are build.

Incidentally, the foregoing embodiment uses the seamless retainer guiding members 29 to remove the differences in level in the passage part along which the retainer 10 passes. On the other hand, such seams exist in the passage part along which the rollers 3 pass, as well as the passage part along which the retainer 10 passes. Accordingly, in a motion guide device directed to rollers with no retainer, which is called an all-roller type of liner motion guide, roller guiding members can be arranged which extend along the entire length of an inner direction passage, similarly to the retainer guiding members 29, and guides the outer peripheral sides of the rollers 3 moving along the inner direction changing passage.

In addition, the structures according to the present invention can be modified into various ways as long as the modified structures are not beyond the gist of the present invention. For example, the rolling elements are not limited to rollers 3, but balls may be employed as such rolling elements. Moreover, the foregoing embodiment has been explained about the liner guide whose moving block is moved linearly. This is however just one example, and the present invention may be applied to a curved-motion guide device guiding curved motions. Further, while the foregoing embodiment uses, as the roller return passage, a half-divided pipe member made of resin, a though-hole formed through the moving block body may be used alone as the roller return passage. Still further, it is not always necessary to separately produce the inner direction changing passage component and the support members, but as an alternative fashion, these elements may be resin-molded with the moving block body.

The invention claimed is:

1. A motion guide device comprising:
    a track rail in which a plurality of rolling-member rolling surficial areas are formed along a longitudinal direction;
    a moving block body in which a plurality of load rolling-member rolling surficial areas are formed to be opposed to the rolling-member rolling surficial areas and a plurality of non-load rolling-member return passages are formed to extend in parallel with the load rolling-member rolling surficial areas;
    a plurality of rolling members that roll between the rolling-member rolling surficial areas of the track rail and the load rolling-member rolling surficial areas of the moving block body; and
    a retainer rotatably retaining the plurality of rolling members as a series of rolling members,
    wherein an outer direction changing passage and an inner direction changing passage that both connect the plurality of load rolling-member rolling surficial areas and the plurality of non-load rolling-member return passages in the moving block body cross each other three-dimensionally,
    characterized in that the motion guide device comprises:
    a side cover disposed on each of both ends of the moving block body in a moving direction thereof and formed so that an outer peripheral side of the outer direction changing passage and an outer peripheral side of the inner direction changing passage cross each other three-dimensionally, wherein the outer peripheral sides of the inner and outer direction changing passages are formed in the side cover;
    an inner/outer direction changing passage component built in the side cover and formed to serve as not only an inner peripheral side of the outer direction changing passage but also an outer peripheral side of the inner direction changing passage together with the outer peripheral side of the inner direction changing passage formed on the side cover, a seam existing between the outer peripheral side of the inner direction changing passage of the inner/outer direction changing passage component and the outer peripheral side of the inner direction changing passage of the side cover;
    a retainer guiding member inserted in the side cover in which the inner/outer direction changing passage component is built, formed to extend over an entire length of the inner direction changing passage, and formed to guide an outer peripheral side of the retainer that passes the inner direction changing passage and to prevent the outer peripheral side of the retainer from passing in direct contact with the seam between the outer peripheral side of the inner direction changing passage of the inner/outer direction changing passage component and the outer peripheral side of the inner direction changing passage of the side cover; and an inner direction changing passage component that forms an inner peripheral side of the inner direction changing passage.

2. The motion guide device of claim 1, characterized in that the inner direction changing passage component has a retainer guiding portion guiding the inner peripheral side of the retainer that passes the inner direction changing passage.

3. The motion guide device of claim 1, characterized in that a retainer-outer-peripheral guide portion guiding an outer peripheral side of the retainer that passes the outer direction changing passage is formed in the side cover, and
a retainer-inner-peripheral guide portion guiding an inner peripheral side of the retainer that that passes the outer direction changing passage is formed in the inner/outer direction changing passage component.

4. A motion guide device comprising:
a track rail in which a plurality of rolling-member rolling surficial areas are formed along a longitudinal direction;
a moving block body in which a plurality of load rolling-member rolling surficial areas are formed to be opposed to the rolling-member rolling surficial areas and a plurality of non-load rolling-member return passages are formed to extend in parallel with the load rolling-member rolling surficial areas; and
a plurality of rolling members that roll between the rolling-member rolling surficial areas of the track rail and the load rolling-member rolling surficial areas of the moving block body,
wherein an outer direction changing passage and an inner direction changing passage that both connect the plurality of load rolling-member rolling surficial areas and the plurality of non-load rolling-member return passages in the moving block body cross each other three-dimensionally,
characterized in that the motion guide device comprises:
a side cover disposed on each of both ends of the moving block body in a moving direction thereof and formed so that an outer peripheral side of the outer direction changing passage and an outer peripheral side of the inner direction changing passage cross each other three-dimensionally, wherein the outer peripheral sides of the inner and outer direction changing passages are formed in the side cover;
an inner/outer direction changing passage component built in the side cover and formed to serve as not only an inner peripheral side of the outer direction changing passage but also an outer peripheral side of the inner direction changing passage together with the outer peripheral side of the inner direction changing passage formed on the side cover, a seam existing between the outer peripheral side of the inner direction changing passage of the inner/outer direction changing passage component and the outer peripheral side of the inner direction changing passage of the side cover;
a rolling-member guiding member inserted in the side cover in which the inner/outer direction changing passage component is built, formed to extend over an entire length of the inner direction changing passage, and formed to guide outer peripheral sides of the rolling members that pass the inner direction changing passage and to prevent the outer peripheral sides of the rolling members from passing in direct contact with the seam between the outer peripheral side of the inner direction changing passage of the inner/outer direction changing passage component and the outer peripheral side of the inner direction changing passage of the side cover; and
an inner direction changing passage component that forms an inner peripheral side of the inner direction changing passage.

5. A method of assembling a motion guide device comprising:
a track rail in which a plurality of rolling-member rolling surficial areas are formed along a longitudinal direction;
a moving block body in which a plurality of load rolling-member rolling surficial areas are formed to be opposed to the rolling-member rolling surficial areas and a plurality of non-load rolling-member return passages are formed to extend in parallel with the load rolling-member rolling surficial areas;
a plurality of rolling members that roll between the rolling-member rolling surficial areas of the track rail and the load rolling-member rolling surficial areas of the moving block body; and
a retainer rotatably retaining the plurality of rolling members as a series of rolling members,
wherein an outer direction changing passage and an inner direction changing passage that both connect the plurality of load rolling-member rolling surficial areas and the plurality of non-load rolling-member return passages in the moving block body cross each other three-dimensionally,
characterized in that the method comprising steps of:
assembling, into a side cover formed to allow both an outer peripheral side of the outer direction changing passage and an outer peripheral side of the inner direction changing passage to cross each other three-dimensionally, an inner/outer direction changing passage component formed to serve as not only an inner peripheral side of the outer direction changing passage but also an outer peripheral side of the inner direction changing passage together with the outer peripheral side of the inner direction changing passage formed on the side cover, a seam existing between the outer peripheral side of the inner direction changing passage of the inner/outer direction changing passage component and the outer peripheral side of the inner direction changing passage of the side cover;
assembling, into the side cover in which the inner/outer direction changing passage component is built, a retainer guiding member guiding an outer peripheral side of a retainer that passes the inner direction changing passage and preventing the outer peripheral side of the retainer from passing in direct contact with the seam between the outer peripheral side of the inner direction changing passage of the inner/outer direction changing passage component and the outer peripheral side of the inner direction changing passage of the side cover;
assembling, into the side cover in which both the inner/outer direction changing passage component and the retainer guiding members are built, an inner direction changing passage component that forms an inner peripheral side of the inner direction changing passage and is formed to have a retainer guiding portion guiding an inner side of the retainer that passes the inner direction changing passage; and
mounting, to the moving block body, the side covers in which the inner/outer direction changing passage component, the retainer guiding member, and the inner direction changing passage component are built.

* * * * *